US009360696B1

(12) United States Patent
Ghali et al.

(10) Patent No.: US 9,360,696 B1
(45) Date of Patent: Jun. 7, 2016

(54) ELECTRONIC DEVICE STACK ASSEMBLY

(71) Applicant: Amazon Technologies, Inc., Seattle, WA (US)

(72) Inventors: Hany Mounir Ghali, San Francisco, CA (US); Gregory Turner Witmer, Mountain View, CA (US); Chin Siong Khor, San Jose, CA (US); Anoop Menon, Capitola, CA (US); Premal Vinodchandra Parekh, Milpitas, CA (US); Robert L. D. Zenner, San Jose, CA (US); Lakshman Rathnam, Mountain View, CA (US); Siddharth Gupta, San Bruno, CA (US); Angeles Marcia Almanza-Workman, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/566,941

(22) Filed: Dec. 11, 2014

(51) Int. Cl.
G02F 1/167 (2006.01)
G02F 1/1333 (2006.01)
G06F 1/16 (2006.01)
G06F 3/041 (2006.01)

(52) U.S. Cl.
CPC ............ G02F 1/13338 (2013.01); G02F 1/167 (2013.01); G06F 1/1643 (2013.01); G06F 1/1656 (2013.01); G06F 3/041 (2013.01)

(58) Field of Classification Search
CPC ..... G02F 1/167; G06F 1/1643; G06F 1/1656; G06F 3/041
USPC .......................................... 359/296; 345/107
See application file for complete search history.

(56) References Cited

U.S. PATENT DOCUMENTS

| 8,382,295 | B1 | 2/2013 | Kim et al. |
| 8,593,395 | B1 | 11/2013 | Puckett et al. |
| 8,749,478 | B1 | 6/2014 | Bowen |
| 9,028,123 | B2 * | 5/2015 | Nichol ................. G02B 6/0018 349/63 |
| 2009/0272639 | A1 | 11/2009 | Mittleman et al. |
| 2014/0062939 | A1 | 3/2014 | Zehner et al. |
| 2014/0192279 | A1 | 7/2014 | Akanuma et al. |
| 2014/0306942 | A1 | 10/2014 | Ahn |

FOREIGN PATENT DOCUMENTS

EP 1357420 A1 10/2003

* cited by examiner

Primary Examiner — Tuyen Tra
(74) Attorney, Agent, or Firm — K&L Gates LLP

(57) ABSTRACT

An electronic device includes a stack assembly and a cover glass. The stack assembly includes an electronic paper display sub-assembly for rendering content, a front light sub-assembly for illuminating the electronic display sub-assembly, and a capacitive touch sensing sub-assembly for detecting touch inputs. The cover glass includes two apertures for the placement of control buttons for the electronic device. Prior to assembly of the electronic device, the cover glass is strengthened after the two apertures are formed so as to strengthen the interior edges of the apertures.

20 Claims, 13 Drawing Sheets

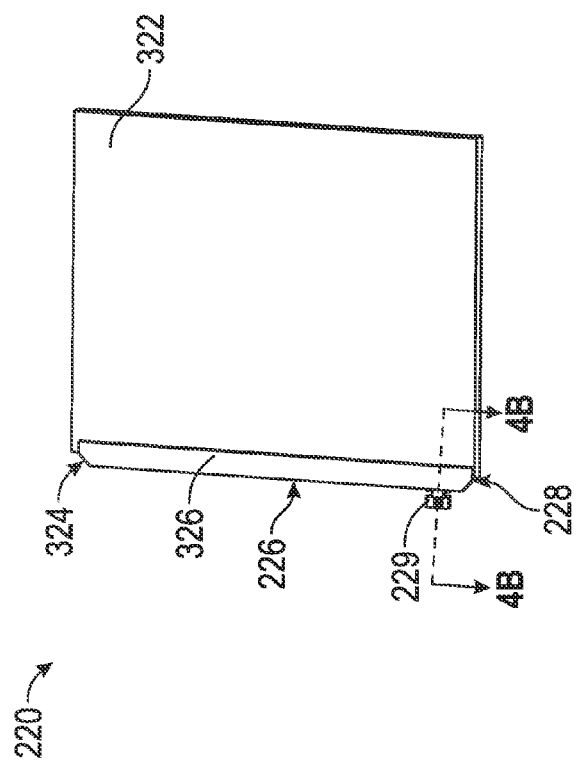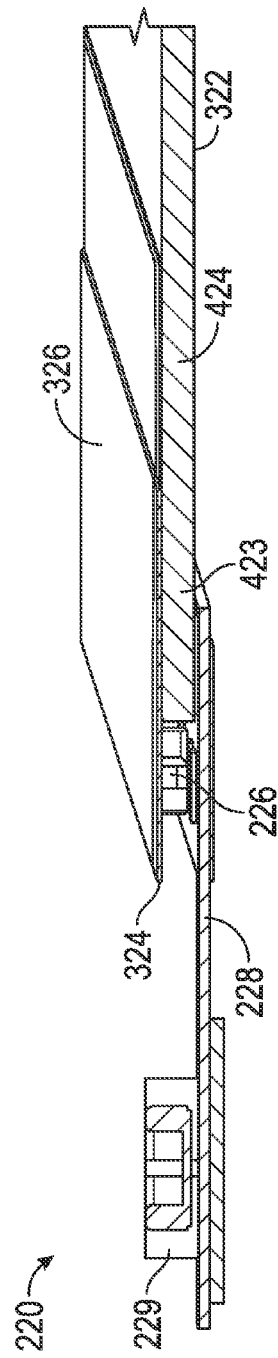

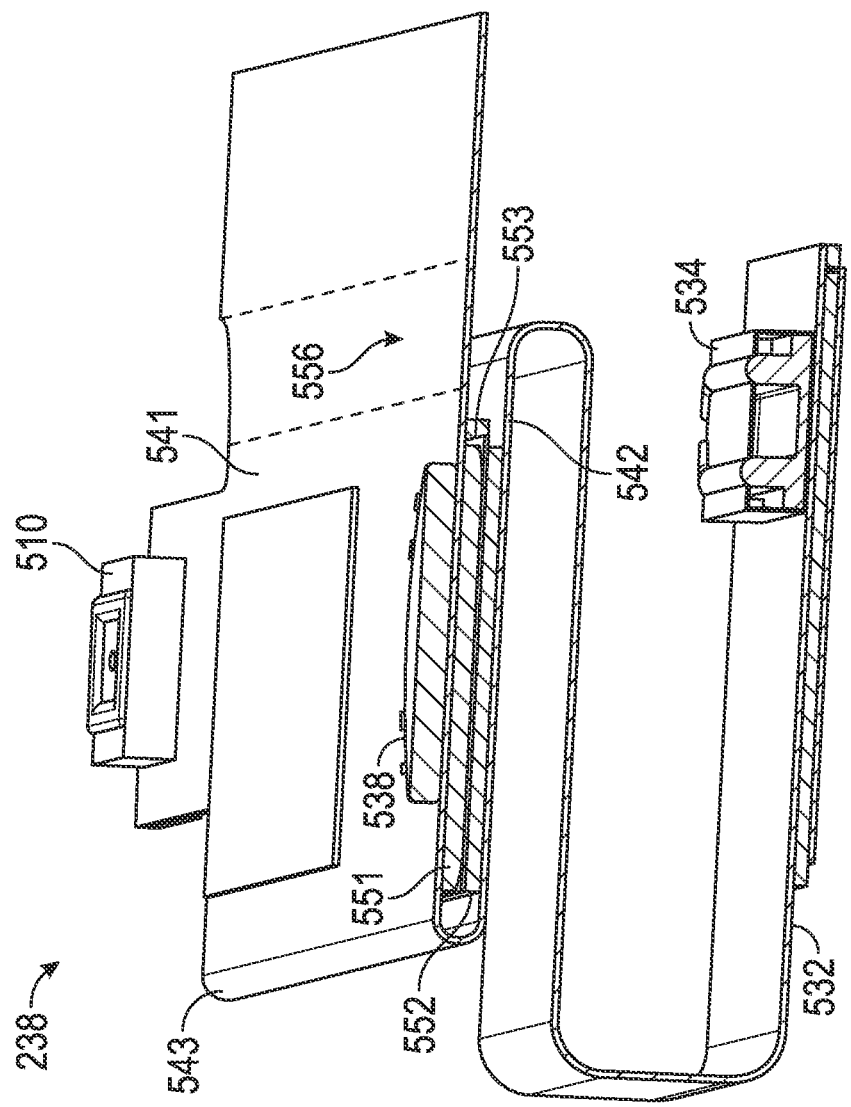

ELECTRONIC DEVICE STACK ASSEMBLY

BACKGROUND

Portable electronic devices, such as electronic book (e-book) readers or tablet computers, have become increasingly popular. Due to the time required to read lengthy novels or other types of e-books, lightweight e-book readers are desirable in order to promote reading for hours at a time. One constraint on usability for portable electronic devices is their durability to withstand accidental falls of the devices and accidental impacts of objects onto the devices. However, increasing the durability of electronic devices typically has the undesirable effect of increasing the weight of the devices due to the increased structural strengthening. Accordingly, there is a need for improved electronic devices with adequate durability to withstand device stress testing while minimizing overall device weight.

BRIEF DESCRIPTION OF DRAWINGS

FIGS. 4A-4B illustrate an example light sub-assembly, in accordance with embodiments of the present invention.

FIGS. 5A-5D illustrate an example display sub-assembly, in accordance with embodiments of the present invention.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

In accordance with aspects of the present invention, an electronic device, such as an e-book reader, may have a stack assembly or a component stack comprising a stack of sub-assemblies or laminated sub-assemblies such as an electronic paper display (EPD) for rendering content, front lighting layered on top of the EPD for illuminating the EPD, and a capacitive touch sensor layered on top of the front lighting for detecting touch inputs. Each sub-assembly may be adhered to another sub-assembly with an optically clear adhesive (OCA), which may form a touch-sensitive front-lit electronic paper display that is capable of accepting user input and rendering content in low ambient light conditions.

Figure 1:
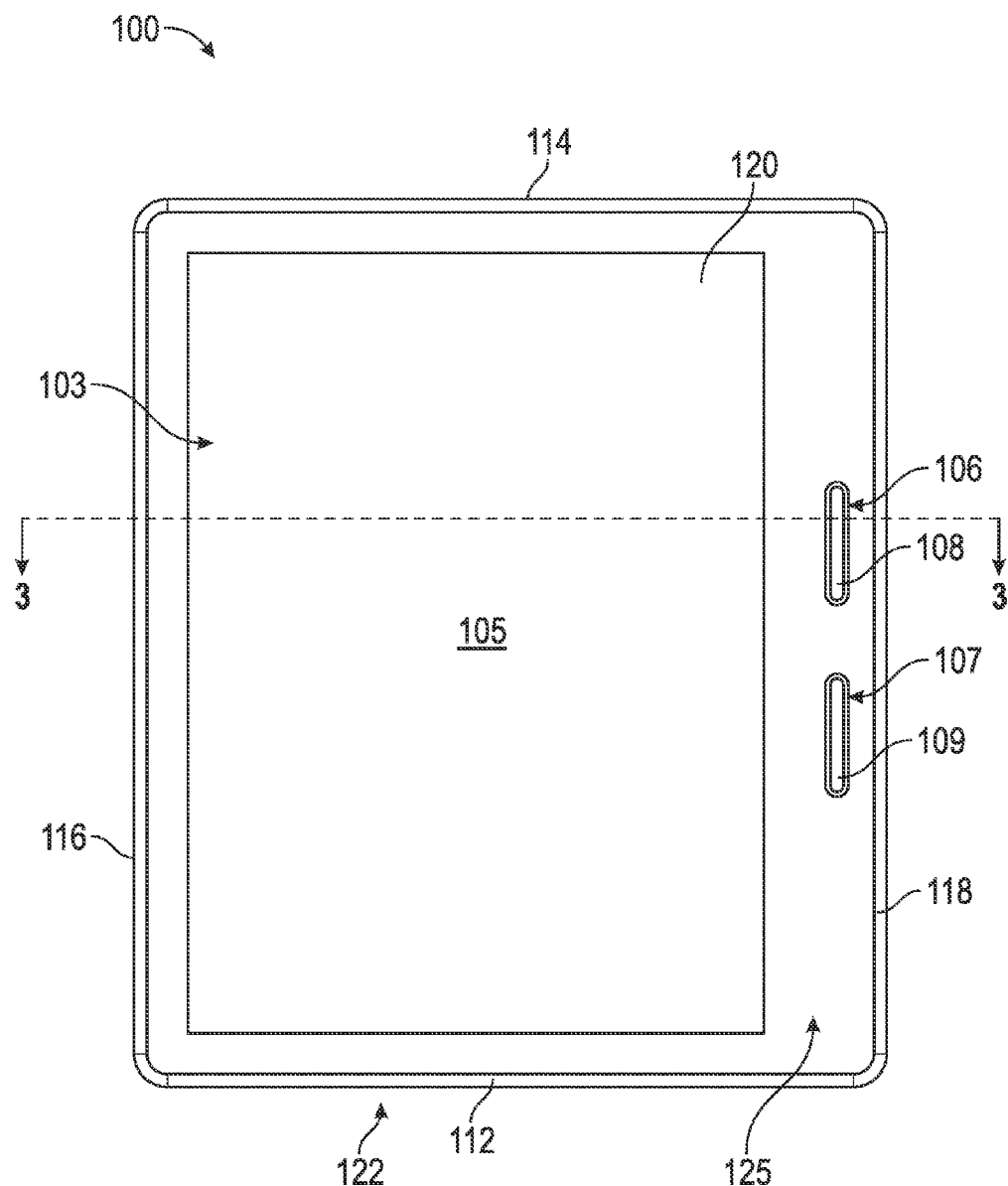
FIG. 1 illustrates an electronic device, in accordance with embodiments of the present invention.

FIG. 1 illustrates an electronic device 100, such as an electronic reader device, in accordance with embodiments of the present invention. The electronic device 100 comprises a stack assembly 103 coupled to a cover glass 105 through which images, content, or content items produced by the stack assembly 103 may be viewed by a user. In some embodiments, the stack assembly 103 may comprise a six inch, 300 dots per inch (DPI) electronic-ink (e-ink) display. The cover glass 105 may provide a protective exterior front surface of the electronic device 100, and may comprise a strengthened glass or a toughened glass. For example, before initiation of a glass strengthening process, the cover glass 105 may be prepared by cutting the cover glass 105 to size from a master sheet of glass, including cutting or drilling the apertures 106,107. Under some embodiments, the outer surface of the cover glass 105 may be prepared to provide a particular feel or roughness, such as a feel or roughness that substantially approximates that of paper or the like. Preparation of the cover glass 105 may include etching, abrading, polishing or the like to provide a paper-like feel or roughness. Under some embodiments, the cover glass 105 may be prepared with a chemical etching that acts as an antiglare or light-diffusing element. Such may be advantageous when the electronic device 100 is used in direct sunlight.

After preparation of the cover glass 105, the cover glass 105 may then be subject to a glass strengthening process, such as a chemical treatment or an ion exchange treatment. For example, the cover glass 105 may be immersed in a molten potassium salt at a high temperature, such that smaller sodium ions of the surface of the cover glass 105 may be replaced by larger potassium ions from the salt bath. The larger ions may provide a layer at the surface of the cover glass 105 that has compressive strength, which may improve the strength of the cover glass 105. Because the cover glass 105 may be prepared or cut prior to the ion exchange, not only are the front and back surfaces of the cover glass 105 strengthened, but the edges of the cover glass 105 may be strengthened as well, including the edges of the apertures 106,107. For example, an aperture 106,107 may be defined by a first opening, an opposite second opening, and an inner surface extending from the first opening to the second opening. The inner surface may be strengthened. Such may be advantageous to fully strengthen all exposed edge or side surfaces of the cover glass 105, in addition to the front and back surfaces. Under some embodiments, the cover glass 105 may be made from materials such as glass, fortified glass, reinforced glass, as well as glass imitations such as plastic, thermoplastic and the like. Under some embodiments, the outer surface of the cover glass 105 may be treated to provide a particular feel or roughness, such as a feel or roughness that substantially approximates that of paper or the like. Treatment of the cover glass 105 may include etching, abrading, polishing or the like to provide a paper-like feel or roughness. Under some embodiments, the cover glass 105 may include a chemical etching that acts as an antiglare or light-diffusing element. Such may be advantageous when the electronic device 100 is used in direct sunlight.

Under some embodiments, after the cover glass 105 is strengthened, a surface of the cover glass 105, such as the surface of the cover glass 105 defined by the aperture 106 or the aperture 107, may be treated to remove or counteract defects such as micro-cracks, miniscule blemishes, or the like. Such defects may, for example, occur or arise during the process of manufacturing or cutting the cover glass 105. Under an embodiment, a surface of the cover glass 105 may be polished to substantially remove such defects. Under another embodiment, glue may be applied to a surface of the cover glass 105 to fill or coat such defects. For example, optically-clear glue may be applied, which may be advantageous to reduce the noticeability of such optically-clear glue. For further example, opaque glue may be applied to block or reduce light that may shine or leak from a surface of the cover glass 105. Under some embodiments, opaque glue may be applied to the surface of the cover glass 105 defined by the first aperture 106 or the second aperture 107 to prevent light from leaking out of spaces or gaps between such surfaces and the first button 108 or the second button 109. It is to be understood that defects on a surface of the cover glass 105 may be stress risers or stress concentrations, and improving the surface quality of the cover glass 105 may be advantageous to improve the mechanical performance or integrity of the cover glass 105 during events such as bending or dropping.

In some embodiments, a display mask 125 may be adhered to the underside of the cover glass 105 to hide from a user's view the components of the electronic device 100 that are underneath the display mask 125. As illustrated in FIG. 1, the display mask may hide certain components beneath portions of the cover glass 105, while allowing the images of the stack assembly 103 to be viewable. The electronic device 100 may comprise a bottom side portion 112, a top side portion 114, a left side portion 116, a right side portion 118, a front portion 120, and a back portion 122. It is to be understood that references to positions of the electronic device 100, such as top, bottom, left, right, front, and back are for illustrative purposes, and are not to be considered limiting.

The electronic device 100 may comprise a first button 108 and a second button 109, such as page turn control buttons, which may be actuated by a user to, for example, turn a page of an electronic book. The cover glass 105 may comprise a first aperture 106 and a second aperture 107 within which the first button 108 and the second button 109 respectively reside. It is to be understood that the electronic device 100 may have no buttons, one button, or more than two buttons. In the embodiment illustrated in FIG. 1, the symmetric design of the page turn buttons may be advantageous to allow a user to hold the electronic device 100 with the right hand, and based on the screen orientation, the second button 109 may be depressed by the thumb of the user to turn to a next page of a book, and the first button 108 may be depressed by the thumb of the user to turn to a previous page of the book. Furthermore, if the device is rotated by a user to be held in the left hand, then based on the screen orientation, the first button 108 may be depressed to turn to a next page of the book and the second button 109 may be depressed to turn to a previous page of the book.

Figure 2:
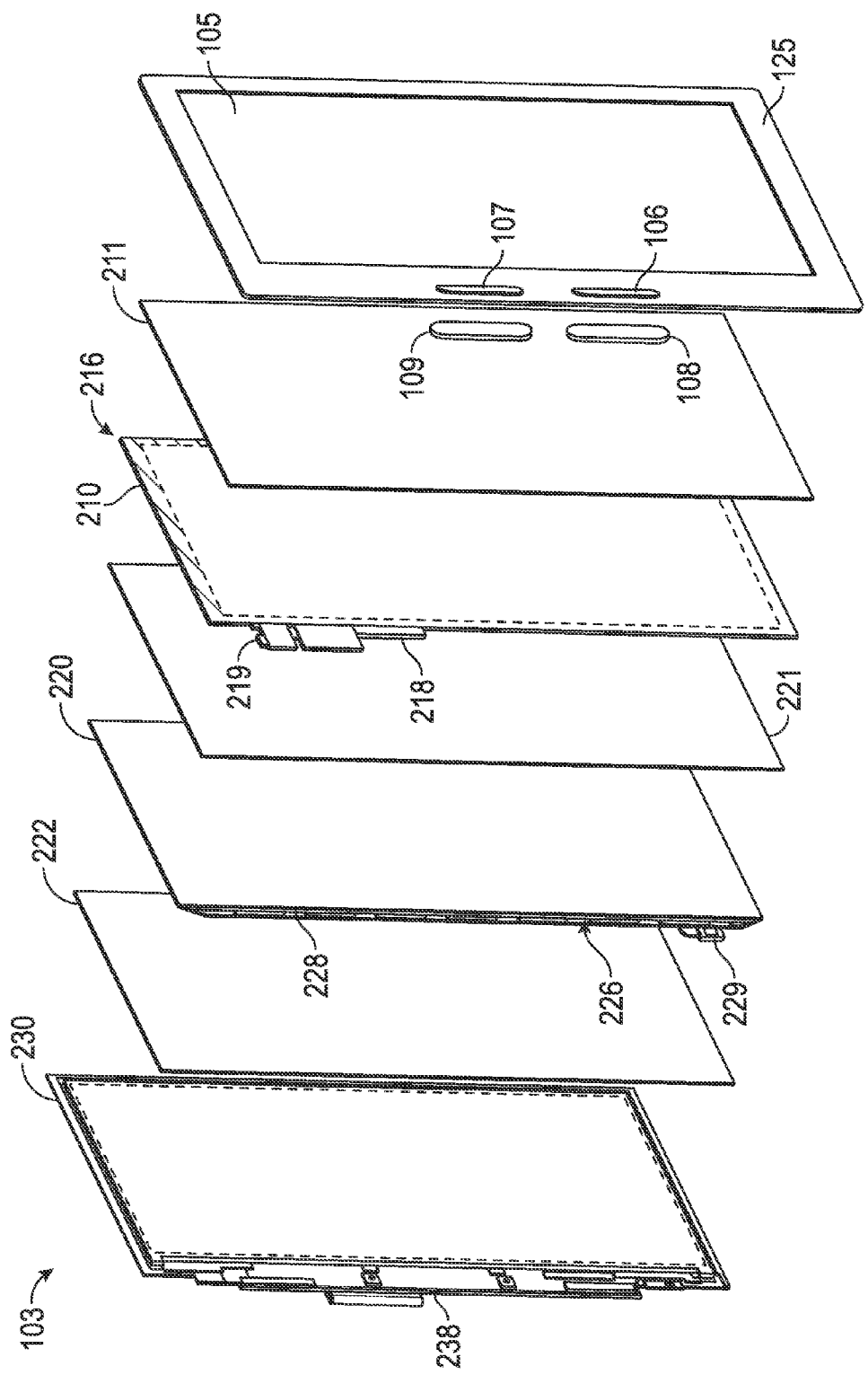
FIG. 2 illustrates an example exploded view of a stack assembly and cover glass, in accordance with embodiments of the present invention.

FIG. 2 illustrates an example exploded view of a stack assembly 103 and a cover glass 105, in accordance with embodiments of the present invention. In the embodiment shown, the cover glass 105 may comprise a first aperture 106 and a second aperture 107, as well as a display mask 125. The stack assembly 103 may comprise a touch sub-assembly 210, a light sub-assembly 220, and a display sub-assembly 230 or a reflective display sub-assembly.

The touch assembly 210 may be coupled to the cover glass 105 via a first optically clear adhesive (OCA) layer 211 or other optical bonding. The first OCA layer 211 may be solid OCA or liquid OCA, and may comprise material such as silicone, acrylic, or the like. Under some embodiments, a sheet of solid OCA may laminate the touch assembly 210 with the cover glass 105. The first OCA layer 211 may comprise a material with ultraviolet (UV) cut capabilities. For example, the UV cut material may block, cut out, stabilize or absorb light with a wave length of about 390 nm or lower. Such UV cut material may provide a UV filter for the purpose of protecting components lower in the stack from UV light that may be incident on the electronic device 100. For example, the UV cut material may cause the display sub-assembly 230 to have reduced discoloration, such as a yellowing discoloration, due to UV light.

Under some embodiments, instead of or in addition to the first OCA layer 211 having UV cut capabilities, the touch sub-assembly 210 may have UV cut capabilities. For example, a coating of UV absorbing material may be applied to a top surface of the touch sub-assembly 210 or UV absorbing material may be integrated or embedded into the touch sub-assembly 210. For example, the touch sub-assembly may comprise material such as polyethylene terephthalate PET or a low birefringence material such as a cyclic olefin polymer (COP), and UV cut material may be integrated into such material of the touch sub-assembly 210. Under some embodiments, UV cut material may be coated to a bottom surface of the cover glass 105. Such may be advantageous because the cover glass 105 may be able to withstand higher temperatures compared to the touch sub-assembly 210, which may facilitate a higher temperature application of a UV cut material. UV cut capabilities of the touch sub-assembly 210 or the cover glass 105 may be advantageous, for example, to reduce yellowing of PET material or flaking of COP material. Furthermore, UV cut capabilities may preserve optically transparent properties of the touch sub-assembly 210 as well as other sub-assemblies beneath the touch sub-assembly 210 such as the light sub-assembly 220. A UV cut material may comprise, for example, hindered amine light stabilizers (HALS) or the like, which may absorb UV light and dissipate such UV light into thermal energy.

It is to be understood that a user may cause an action to occur by interacting with the touch sub-assembly 210. For example, an action may be turning the page of an electronic book. Interacting with the touch sub-assembly 210 may comprise applying a touch or multiple touches to a portion of the cover glass 105. In some embodiments, the touch sub-assembly may be capable of detecting touches as well as determining an amount of pressure or force of those touches. A touch sub-assembly 210 may comprise a capacitance touch sensitive sensor, an infrared touch screen sensor, a force sensitive resistance sensor, or the like.

The touch sub-assembly 210 may comprise a touch flexible printed circuit (FPC) 218 having a touch connector 219. A portion of the touch FPC 218 adjacent to the touch connector 219 may be adhered to the cover glass 105. Such may be advantageous to prevent vibration or other movement from causing the portion of the touch FPC 218 to scratch the cover glass 105 or the display mask 125 of the cover glass 105.

The touch sub-assembly 210 may also comprise signal lines or traces along the outer edge or border of the touch sub-assembly 210. As shown, the touch sub-assembly 210 may also comprise an antenna window portion 216 or keep-out area of nonconductive material. For example, an antenna placed in an antenna window having an antenna window portion 216 of nonconductive material may have reduced shielding compared to an antenna placed within conductive material, such as high-conductivity metal. An antenna within an antenna window may have improved transmission and reception capabilities due to a distance, clearance or separation from conductive elements of the electronic device 100, such as the signal lines. Under some embodiments, the signal lines may be provided along a first edge of the touch sub-assembly 210 to which the touch FPC 218 is coupled. Signal lines may also be provided along a second edge of the touch sub-assembly 210 that is opposite to a third edge having the antenna window portion 216. The first edge may be between the second edge and the third edge of the touch sub-assembly 210. Positioning signal lines along the first edge and the second edge of the touch sub-assembly 210 may be advantageous to keep the antenna window portion 216 free of conductive material. Under some embodiments, the antenna window portion 216 may include a fourth edge that is opposite the first edge and in between the second edge and the third edge of the touch sub-assembly 210.

The light sub-assembly 220 may comprise one or more light sources 226, such as light emitting diodes (LEDs) provided on an edge of the light sub-assembly 220. As shown, the light sub-assembly 220 may also comprise a light FPC 228 having a light connector 229. It is to be appreciated that under some embodiments, the light connector 229 may be generally positioned along an opposite end of an edge in relation to the touch connector 219. The light sub-assembly 220 may be coupled to the touch sub-assembly 210 via a second OCA layer 221 or other optical bonding. The second OCA layer 221 may be solid OCA or liquid OCA, and may comprise material such as silicone, acrylic, or the like.

The display sub-assembly 230 or display sub-assembly may represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. In some embodiments, the display sub-assembly 230 may comprise an electrophoretic display or a reflective LCD display. Though not shown, in some embodiments, the display sub-assembly 230 may be coupled to a corresponding display controller. The display sub-assembly 230 may comprise a display FPC 238. The display FPC 238 may comprise a touch socket 510 and a light socket 520, with each positioned on opposing ends of the display FPC 238 along a side of the display sub-assembly 230. It is to be understood that the position of the touch socket 510 may correspond to the position of the touch connector 219 of the touch FPC 218, and the position of the light socket 520 may correspond to the position of the light connector 229 of the light FPC 228. Under some embodiments, the sockets 510,520 and the connectors 219,229 may couple via board-to-board coupling. Under other embodiments, the connectors 219,229 may be respectively bonded to the sockets 510,520, for example with anisotropic conductive film (ACF).

In an embodiment, the display sub-assembly 230 may comprise an electrophoretic display that moves particles between different positions to achieve different color shades. For instance, with a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are located near the rear of the display, the particles absorb the incident light and, hence, cause the pixel to appear black to a viewing user. In addition, particles may situate at varying locations between the front and rear sides of the display to produce varying shades of gray. Furthermore, as used herein, a "white" pixel may comprise any shade of white or off white, while a "black" pixel may similarly comprise any shade of black.

In another embodiment, the display sub-assembly 230 may comprise an electrophoretic display that includes oppositely charged light and dark particles. In order to render white, the display controller moves the light particles to the front side of the display by creating a corresponding charge at an electrode near the front and moves the dark particles to the back of the display by creating a corresponding charge at an electrode near the back. In order to render black, the display controller changes the polarities and moves the dark particles to the front and the light particles to the back. Furthermore, to create varying shades of gray, the display controller may utilize different arrays of both light and dark particles.

It is to be understood that the display sub-assembly 230 described herein may comprise any other type of electronic-paper technology or reflective-display technology, such as gyricon displays, electrowetting displays, electrofluidic displays, interferometric modulator displays, cholesteric LCDs, and the like. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink, while a "black" value of the pixel may correspond to a darkest red of the color filter.

The display sub-assembly 230 may be coupled to the light sub-assembly 220 via a third OCA layer 222 or other optical bonding. The third OCA layer 222 may be solid OCA or liquid OCA, and may comprise material such as silicone, acrylic, or the like. The stack assembly 103 may comprise the first button 108 and the second button 109. Each button 108, 109 may be coupled to the display FPC 238 and portions of each button 108,109 may be respectively positioned within the first aperture 106 and the second aperture 107. The display FPC 238 may be adhered to the display glass substrate 333 with anisotropic conductive film (ACF).

Figure 3:
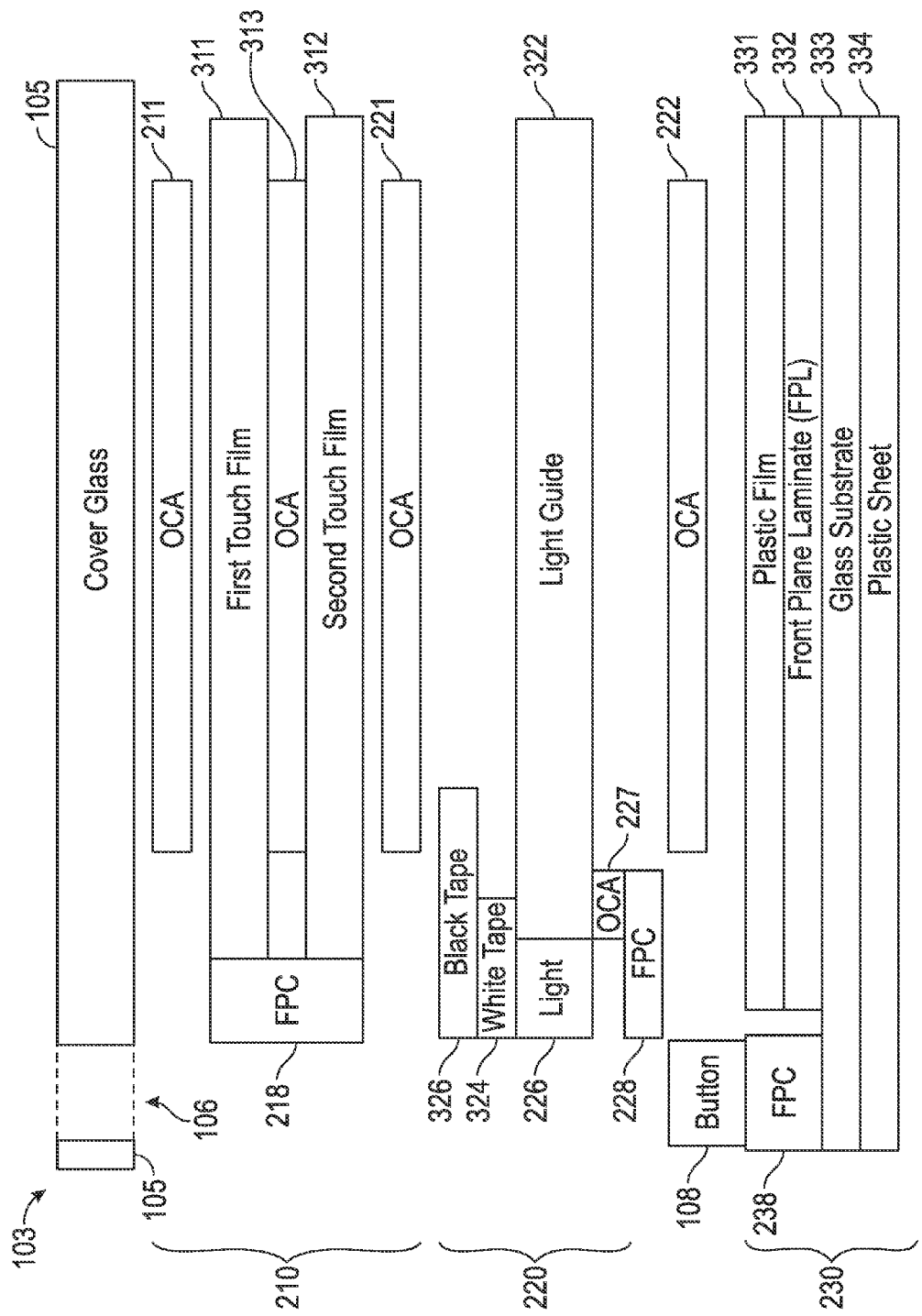
FIG. 3 illustrates an example exploded schematic cross-section of a stack assembly and a cover glass, in accordance with embodiments of the present invention.

FIG. 3 illustrates an example exploded schematic cross-section of a stack assembly 103 and a cover glass 105 at line 3-3 of the embodiment of FIG. 1, in accordance with embodiments of the present invention. As illustrated, the cover glass 105 may have a first aperture 106 configured to receive a first button 108. In some embodiments, the stack assembly 103 may schematically comprise stacked layers or laminated layers.

The stack assembly 103 may comprise the touch sub-assembly 210 that may be adhered to the cover glass 105 via the first OCA layer 211. The touch sub-assembly 210 may receive touch inputs related to displayed content, such as a touch input to turn the page of an electronic book. As illustrated, the first touch film 311 may be adhered to the cover glass 105 via the first OCA layer 211. The touch sub-assembly 210 may comprise a first touch film 311 and a second touch film 312 adhered to the first touch film 311 via a fourth OCA layer 313. The touch films 311,312 may comprise a polyethylene terephthalate (PET) material. The touch sub-assembly 210 may include a touch FPC 218 that may couple with the display FPC 238. In some embodiments, the touch films 311,312 may comprise patterns made from indium tin oxide (ITO), copper, printed ink or the like, and the patterns may form rows and columns. Such patterns may provide a grid of capacitors that may project an electric field through the cover glass 105, and the capacitance of one or more capacitors may be changed by the placement of a finger near the cover glass 105. The patterns may be coupled to the signal lines described above. It is to be understood that the number of touch films of the touch sub-assembly 210 is not meant to be limiting, and any number of touch films may be used, such as four touch films with each having a capacitance grid pattern.

The stack assembly 103 may comprise the light sub-assembly 220 that may be adhered to the touch sub-assembly 210 via the second OCA layer 221. As illustrated, a light guide 322 may be adhered to the second touch film 312 via the second OCA layer 221. In some embodiments, a refractive index of the second OCA layer 221 may be less than a refractive index of the light guide 322. For example, the difference between the refractive index of the light guide 322 and the refractive index of the second OCA layer 221 may be at least 0.1. In some embodiments, the difference can be 0.3. For example, if the light guide 322 has a refractive index of 1.58, then the refractive index of the second OCA layer 221 may be 1.48. It is to be understood that the selection of the material of the light guide 322, where the material has a refractive index, may be used to determine the appropriate refractive index of the second OCA layer 221. It is also to be understood that other OCA layers, such as the third OCA layer 222, may also have a refractive index that is less than the refractive index of the light guide 322.

The light sub-assembly 220 may comprise one or more light sources 226 and the light guide 322 that may direct light to the display sub-assembly 230. For example, directing light to the display sub-assembly 230 may enhance the visibility of a displayed content such as by enhancing the contrast of the displayed content. Under some embodiments, the light guide 322 may be a light guide film or a light guide panel which may include light defractive elements, such as grating elements, for directing light from the light source 226 onto the display sub-assembly 230, thus illuminating the display sub-assembly 230. The light guide 322 may comprise a polycarbonate material, polymethyl methacrylate (PMMA) material, or the like. Under some embodiments, utilizing polycarbonate material may provide improved thermal stability. A grating element may be a protrusion, a ridge, a bulge, a channel, a groove, or the like of the light guide 322. Under some embodiments, the light guide 322 may include light refractive elements, such as a lenslet or a small lens.

The light source 226 may comprise one or more LEDs, such as ten LEDs, which may reside toward a side edge of the electronic device 100. The light from the light source 226 may generally travel along the plane of the light guide 322 and the display sub-assembly 230 until, for example, it contacts defractive or refractive elements, which generally direct the light downwards or towards the display sub-assembly 230. In some instances, the multiple LEDs are positioned such that they collectively emulate a single point source. For example, each LED may emit light over a particular angle that is in the shape of a triangle. The LEDs may be aligned and spaced (relative to one another and relative to an active area of the display) such that these triangle shapes of emitted light overlap in a manner where the display does not include overly bright spots or overly dim spots. Under some embodiments, the distance from the center of one LED to the center of an adjacent LED may be about 12.6 mm.

White tape 324 may be adhered to the light source 226 and a first light guide surface portion 423 of the light guide 322. The white tape 324 or other type of light-diffusing element or light-reflecting element may be applied on top of the light source 226 or on a perimeter of the light source 226, which may help to diffuse light from the light source 226 and increase the uniformity of the light from the light source 226. Black tape 326 may be adhered to the white tape 324 and a second light guide surface portion 424 of the light guide 322 that is adjacent to the white tape 324. The black tape 326 or other type of light-absorbing or opaque element may absorb or block stray light from the light source 226, which may be advantageous to maintain uniformity or smoothness of the light propagated by the light source 226 and to reduce the amount of light that may escape or leak. The black tape 326 adhered over the white tape 324 may be advantageous when the distance or gap between the light source 226 and the active light-directing area of the light guide 322 is reduced, such as to reduce the overall size of the electronic device 100. In some embodiments the adhesive of the white tape 324 and the adhesive of the black tape 326 may have a refractive index that is less than the refractive index of the light guide 322.

As illustrated, a portion of the black tape 326 may overhang the white tape 324, and a portion of the second OCA layer 221 may be adhered to a portion of the black tape 326 that overhangs the white tape 324. Under some embodiments, the second OCA layer 221 may comprise a conformable or elastic material that is configured to adhere to the overhang or step of the black tape 326 or to absorb the thickness of the black tape 326 while maintaining an adequate bond between the light guide 322 and the second touch film 312. The light sub-assembly 220 may include a light FPC 228 that may couple with the display FPC 238.

The stack assembly 103 may comprise the display sub-assembly 230 that may be adhered to the light sub-assembly 220 via the third OCA layer 222. In some embodiments, a refractive index of the third OCA layer 222 may be less than a refractive index of the light guide 322. As illustrated, the display plastic film 331 may be adhered to the light guide 322 via the third OCA layer 222. The display sub-assembly 230 may comprise a display glass substrate 333, such as a flexible sheet of glass or a sheet of glass having a thickness of about 0.2 millimeters (mm). In some embodiments, the display glass substrate 333 may have a thickness that ranges from about 0.025 mm to about 0.2 mm. A display plastic sheet 334 may be adhered to a surface of the display glass substrate 333 via, for example a pressure sensitive adhesive (PSA). The display plastic sheet 334 may comprise a polyethylene terephthalate (PET) material or the like. The display glass substrate 333 may be flexible, supple, elastic, giving, springy, or the like, such that the display glass substrate 333 may be capable to bend during usage before shattering or breakage may occur. A display glass substrate 333 having a thickness of about 0.2 millimeters (mm) may be advantageous because such a display glass substrate 333 may be thin enough to be flexible. The display plastic sheet 334 may be advantageous to support the display glass substrate 333 from bending or flexing beyond an amount in which shattering or breakage may occur. The display plastic sheet 334 may be further advantageous to further support the coupling of the display FPC 238 to the 0.2 mm thick display glass substrate 333. The display plastic sheet 334 may be further advantageous during assembly of the stack assembly 103 to protect the display glass substrate 333 from scratches, fractures, chips, or impacts that may cause the display glass substrate 333 to otherwise break. For example, the display plastic sheet 334 may be advantageous for being less brittle than the display glass substrate 333. In some embodiments, a plastic sheet or other flexible substrate material may be utilized instead of the display glass substrate 333 and the display plastic sheet 334.

The electronic paper display (EPD) layer 332 or display ink layer may be adhered to the display glass substrate 333. It is to be understood that the EPD layer 332 may comprise a laminate as is commonly known in the art for e-ink displays. In some embodiments, the EPD layer 332 may comprise micro-capsules having positively charged white pigment or particles and negatively charged black pigment or particles suspended within a clear fluid such as oil. The EPD layer 332 may also comprise top and bottom electrodes, which may be coupled to the display FPC 238. For example, a thin-film-transistor (TFT) layer may be above the top of the display glass substrate 333, and beneath the bottom of the display plastic film 331 there may be a single electrode which may be a common electrode. Such top and bottom electrodes may apply a positive or negative electric field such that corresponding particles move to the top of the microcapsule where they become visible to the user. A display plastic film 331 may be positioned over the EPD layer 332. The display plastic film 331 may be adhered to the EPD layer via an optically clear adhesive. It is to be understood that although the display plastic film 331 is illustrated as a separate layer from the EPD layer 332, in some embodiments, the EPD layer 332 may comprise the display plastic film 331. The display plastic film 331 may comprise a polyethylene terephthalate (PET) material or the like.

Under some embodiments, the cover glass 105 may have a thickness of about 550 microns. The first OCA layer 211 may have a thickness of about 0.15 mm. The first touch film 311 and the second touch film 312 may each have a thickness of about 100 microns, and the fourth OCA layer 313 may have a thickness of about 50 microns. The second OCA layer 221 may have a thickness of about 0.15 mm. The light guide 322 may have a thickness of about 400-500 microns. The white tape 324 may have a width of about 4.76 mm along the edge of the light guide 322, and the black tape 326 may have a width of about 7.5 mm along the edge of the light guide 322. The third OCA layer 222 may have a thickness of about 0.175 mm. The display plastic film 331 may have a thickness of about 116 microns, an optically clear adhesive between the display plastic film 331 and the EPD layer may have a thickness of about 50 microns, the EPD layer 332 may have a thickness of about 192 microns, the display glass substrate 333 may have a thickness of about 0.2 mm, and the display plastic sheet 334 may have a thickness of about 143 microns. It is to be understood that the dimensions are for illustrative purposes, and other suitable dimensions may be utilized. It is to be further understood that a stack assembly 103 may comprise different layers than those schematically shown in FIG. 3, and that those variations of layers are encompassed within the embodiments disclosed herein.

FIGS. 4A-4B illustrate an example light sub-assembly 220, in accordance with embodiments of the present invention. FIG. 4A illustrates a front view of a light sub-assembly 220 having a light guide 322. Although not visible in the illustration of FIG. 4A, a plurality of light sources 226 may be positioned along the edge of the light guide 322. As illustrated, the black tape 326 may be positioned above the light sources 226 along the edge of the light guide 322, and the white tape 324, which is not visible in FIG. 4A, may be positioned along the edge of the light guide 322 underneath the black tape 326. A light connector 229 may be coupled to the light FPC 228, which may be electronically coupled to the light source 226 and mechanically coupled to the light guide 322. The light connector 229 may be configured to couple to the light socket 520 of the display FPC 238.

FIG. 4B illustrates a cross-sectional perspective view of a light sub-assembly 220 at line 4B-4B of the embodiment of FIG. 4A. The light connector 229 may be coupled to the light FPC 228. The light FPC 228 may be mechanically coupled to the light guide 322 via the fifth OCA layer 227. The light FPC 228 may be electronically coupled to the light source 226. The white tape 324 may be adhered to the light source 226 and to a first light guide surface portion 423 of the light guide 322. The black tape 326 may be adhered to the white tape 324 and to a second light guide surface portion 424 of the light guide 322.

Figure 5A:
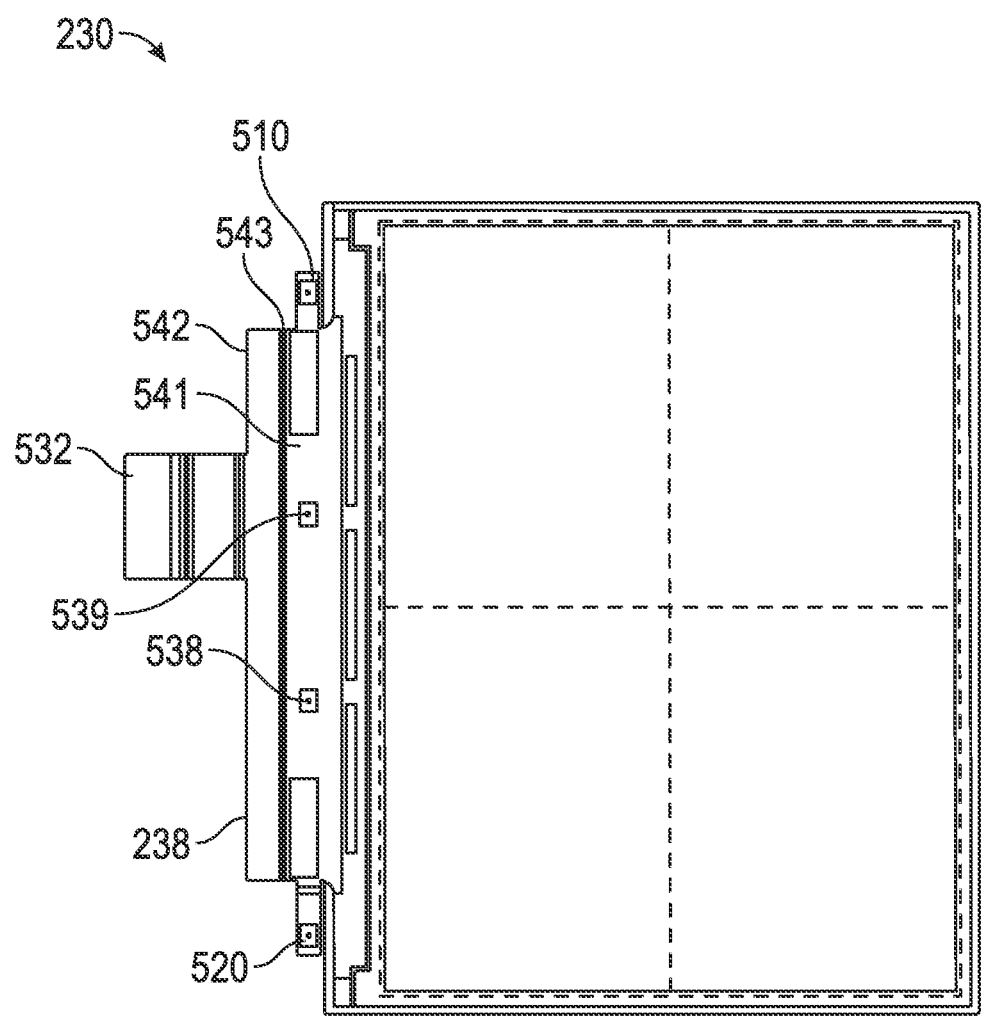

FIGS. 5A-5D illustrate an example display sub-assembly 230, in accordance with embodiments of the present invention. FIG. 5A illustrates a front view of the display sub-assembly 230 comprising a display FPC 238. The display FPC 238 has a first display FPC portion 541, a second display FPC portion 542 coupled to the first display FPC portion 541 via a fold portion 543, and a display FPC tail 532 coupled to the second display FPC portion 542. The display FPC 238 may include a touch socket 510, to which the touch connector 219 may couple, and may comprise a light socket 520, to which the light connector 229 may couple. The display FPC 238 may also include a first dome switch 538 and a second dome switch 539. In an embodiment, the first button 108 may be positioned above the first dome switch 538, and when a user depresses the first button 108, the first dome switch 538 may be actuated via the depression. After actuation, the dome switch 538 may include a spring to cause the button to return to a non-actuating position. In some embodiments, the first button 108 may comprise a material, such as rubber, that returns or springs the first button 108 to the non-actuating position. It is to be understood that the dome switches 538, 539 are a representative embodiment, and other suitable switch assemblies may be utilized.

In some embodiments, the electronic device 100 may have the display FPC 238 along a single edge of the electronic device. The display FPC 238 may have an upper end providing the touch socket 510. The display FPC 238 may have a lower end providing the light socket 520. The display FPC 238 may have a middle portion providing one or more dome switches 538, 539. Such may be advantageous so that the touch socket 510, the light socket 520 and the dome switches 538, 539 and corresponding buttons 108, 109 do not overlap horizontally.

In some embodiments, the touch FPC 218 and the light FPC 228 may be provided with tolerance along the horizontal space or x,y space. For example, after the touch sub-assembly 210 is laminated to the cover glass 150, the light sub-assembly 220 is laminated to the touch sub-assembly 210, and the display sub-assembly 230 is laminated to the light sub-assembly 220, then the touch connector 219 may be coupled to the touch socket 510 and the light connector 229 may be coupled to the light socket 520. Laminating the stack assembly 103 prior to coupling the connectors 219, 229 to the sockets 510, 520 may be advantageous because the lamination of the sub-assemblies 210, 220, 230 may be visible to the user and thus may be important for user acceptance. To facilitate the coupling of the connectors 219, 229 to the sockets 510, 520, degrees of freedom may be applied to the touch connector 219 and the light connector 229 to facilitate the connection of such connectors coming from different laminations of the stack assembly 103 or component stack. Under some embodiments, tolerances, for example of hundreds of microns, along the horizontal space are accommodated. For example, a neck area of a connector may be utilized to absorb such tolerances. Such may be advantageous to provide compliant or flexible connectors 219, 229 when coupling them to the sockets 510, 520 in a slightly different position within the horizontal space.

Figure 5B:
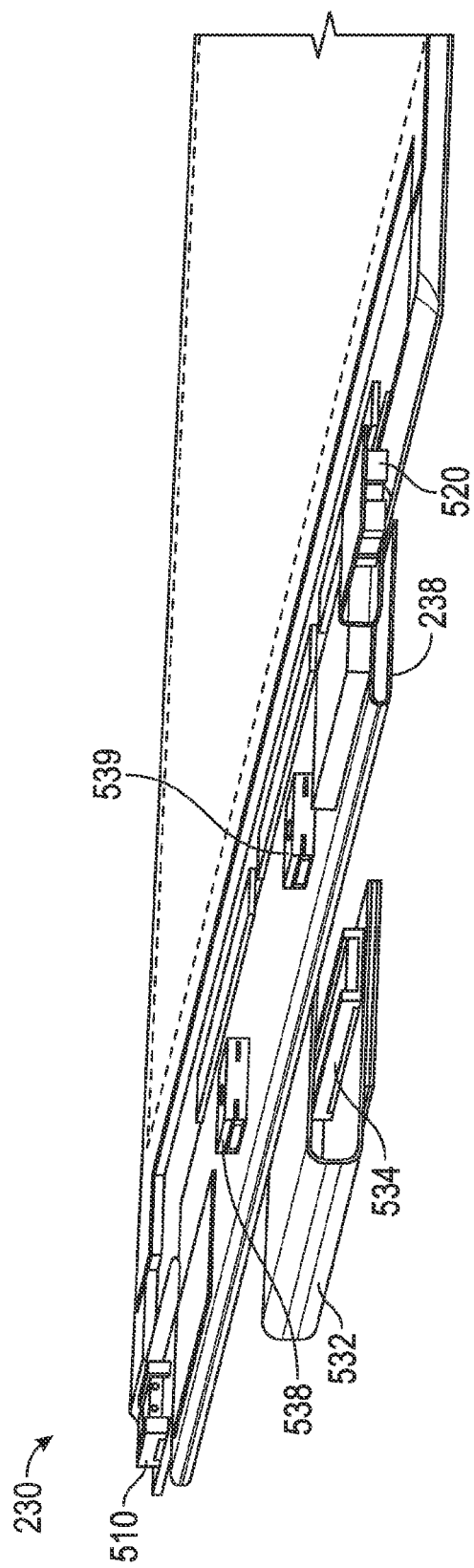

FIG. 5B illustrates a perspective view of the display sub-assembly 230 having a display FPC 238. The display FPC 238 may comprise a display FPC tail 532 having a display connector 534. Under some embodiments, a portion of the display FPC tail 532 may be adhered to an enclosure or frame of the electronic device 100. Although not shown, the display connector 534 may couple to a display socket of a mainboard module of the electronic device 100. The display FPC 238 may include the touch socket 510, the light socket 520, the first dome switch 538, and the second dome switch 539.

Figure 5C:
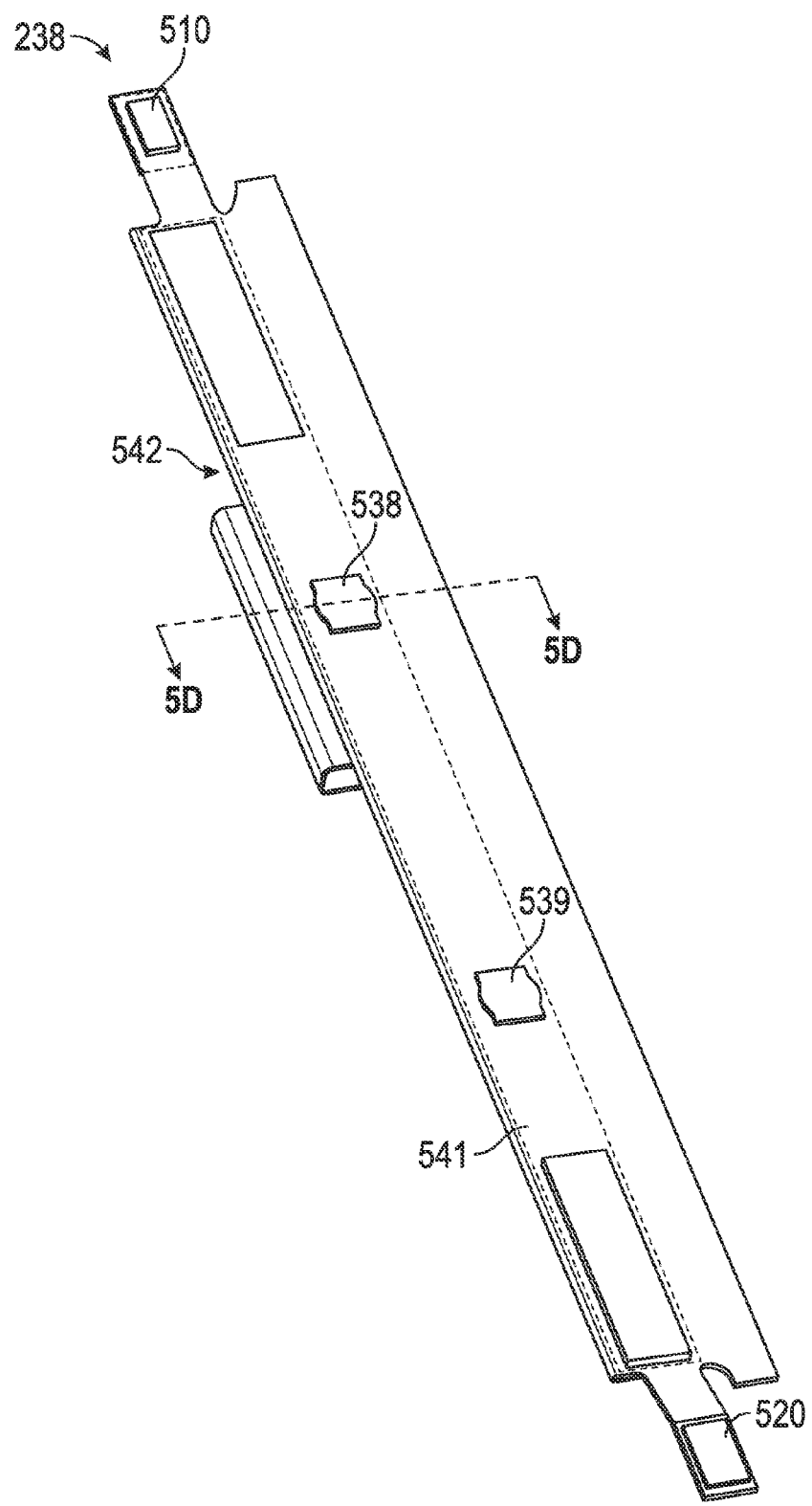

FIG. 5C illustrates a perspective view of the display FPC 238 of the display sub-assembly 230. The display FPC 238 may include a first display FPC portion 541 to which the first dome switch 538 and the second dome switch 539 may be coupled. Although not visible in FIG. 5C, the display FPC 238 may include the second display FPC portion 542 that may be folded underneath the first display FPC portion 541. The display FPC 238 may include the touch socket 510 and the light socket 520.

FIG. 5D illustrates a cross-sectional perspective view of the display FPC 238 of the display sub-assembly 230 at line 5D-5D of the embodiment of FIG. 5C. The display FPC 238 may include the first dome switch 538, which may be configured to be actuated by the first button 108. The first dome switch 538 may be coupled to the first display FPC portion 541 and the second display FPC portion 542 may be folded beneath the first display FPC portion 541 via the fold portion 543. In some embodiments, a first support structure 551 may be adhered to the first display FPC portion 541 with a thermally-activated adhesive or the like, and a second support structure 552 may be coupled to the second display FPC portion 542 with a thermally-activated adhesive or the like. The first support structure 551 may be adhered to the second support structure 552 with a support adhesive 553. The support structures 551,552 may comprise a stainless steel material or the like, which may be advantageous to provide support for a depression of the first button 108. For example, one or more support structures 551,552 may provide a thickness or stiffness that may prevent the display glass substrate 333 from breaking when the first button 108 is depressed by a user. Furthermore, one or more support structures 551,552 may transfer the force of the depression of the first button 108 via the support structures 551,552 to the enclosure or frame of the electronic device 100. It is to be understood that the above description of the first button 108 and the first dome switch 538 may also apply to the second button 109 and the second dome switch 539.

Under some embodiments, the display FPC 238 may have a flex portion 556. The flex portion 556 may allow the display FPC 238 to bend to accommodate the placement of the first button 108 on top of the first dome switch 538 and within the aperture 106. For example, the flex portion 556 may be a less stiff area allowing for a bend, such as by having a single layer of copper instead of multiple layers and not having vias in the flex portion 556. Such may be advantageous to allow insertion of the first button 108 after lamination of the stack assembly 103. In some embodiments, the first button 108 comprises a rubber material and is held in place through pressure from the display FPC 238 against the cover glass 105.

Figure 6A:
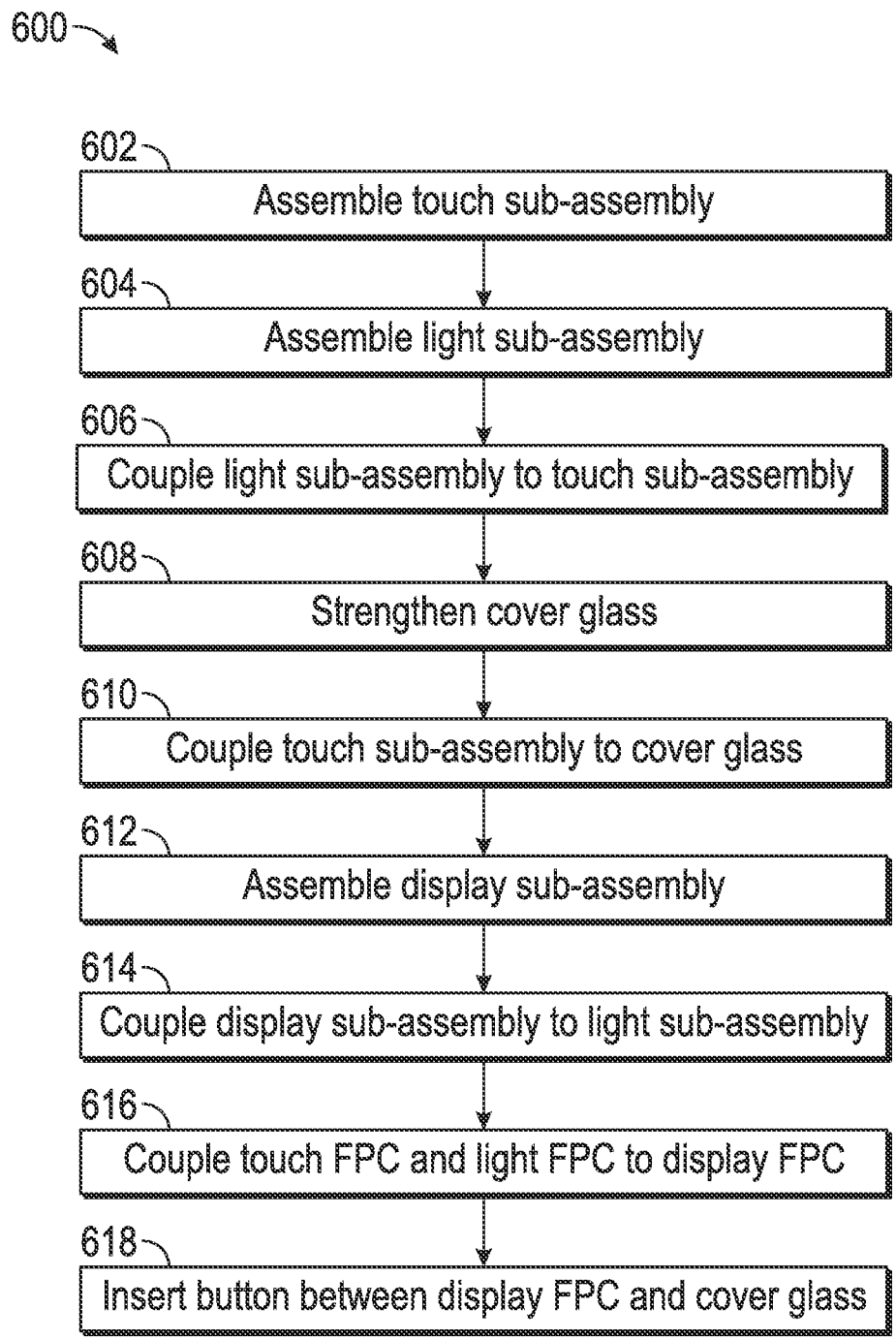
FIGS. 6A-6D illustrate example flow diagrams of assembling an electronic device, in accordance with embodiments of the present invention.
Figure 6B:
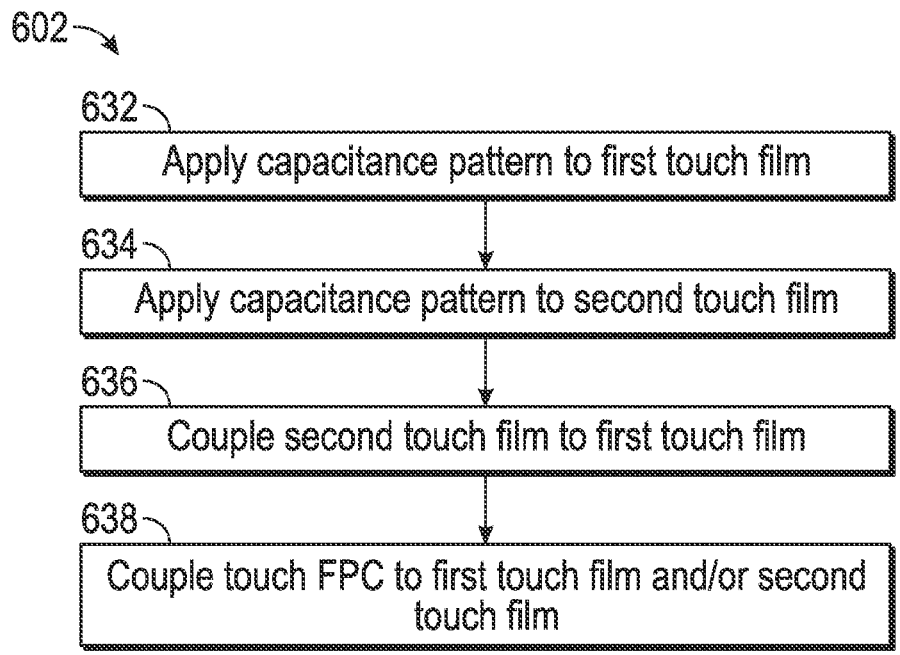

FIGS. 6A-6D illustrate example flow diagrams of assembling an electronic device 100, in accordance with embodiments of the present invention. The order in which the operations are described is not intended to be construed as a limitation, and any number of the described operations can be combined in any order and/or in parallel to implement the process. FIG. 6A illustrates an example flow diagram 600. At step 602, the touch sub-assembly 210 may be assembled, for example as illustrated in flow diagram 602 of FIG. 6B. At step 632, a capacitance grid pattern may be applied to a first surface of the first touch film 311. At step 634, a capacitance grid pattern may be applied to a first surface of the second touch film 312. At step 636, the first surface of the second touch film 312 is coupled to a second surface of the first touch film 311 using, for example, an OCA layer. At step 638, the touch FPC 218 is coupled to a first edge of the first touch film 311 and/or a first edge of the second touch film 312 using, for example, another OCA layer.

Figure 6C:
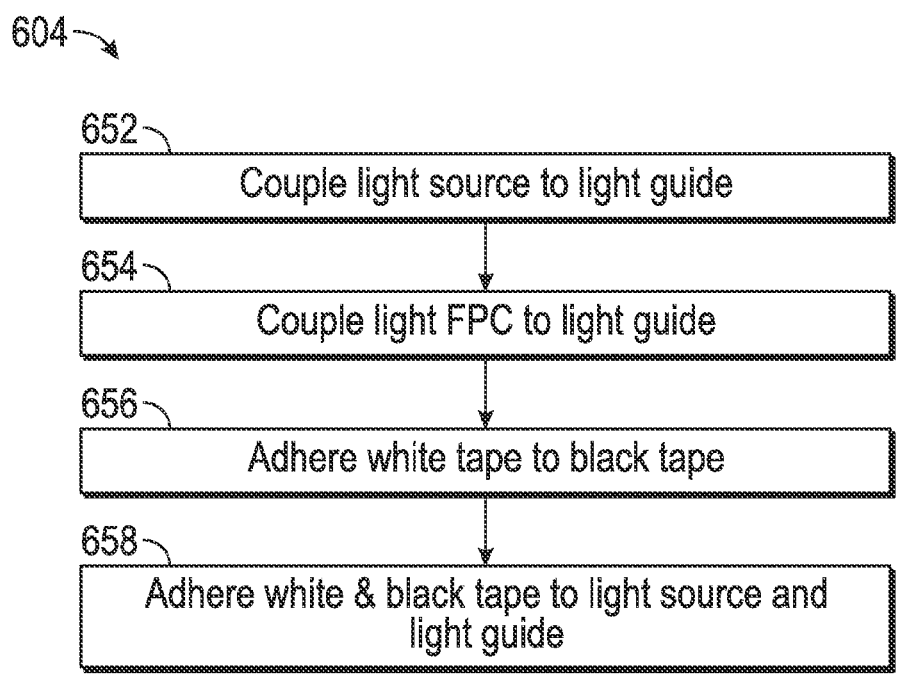

Returning to FIG. 6A at step 604, the light sub-assembly 220 may be assembled, for example as illustrated in flow diagram 604 of FIG. 6C. At step 652, one or more light sources 226 may be coupled to a first edge of the light guide 322. At step 654, the light FPC 228 may be mechanically coupled to the light guide 322 and electronically coupled to the light sources 226. In some embodiments, the light FPC 228 may be soldered to each light FPC 228, and there may be a gap or space between a light source 226 and the light guide 322. At step 656, the white tape 324 may be adhered to the black tape 326. At step 658, the combined white tape 324 and black tape 326 may be adhered to the light sources 226 and the light guide 322, such that the white tape 324 is adhered to the light sources 226 and the first light guide surface portion 423 and the black tape 326 is adhered to the white tape 324 and the second light guide surface portion 424 of the light guide 322.

Returning to FIG. 6A at step 606, the light sub-assembly 220 is coupled to the touch sub-assembly 210 via the second OCA layer 221. For example, a first surface of the light guide 322 may be adhered to a second surface of the second touch film 312 such that the first edge of the light guide 322 aligns with the first edge of the second touch film 312.

At step 608, the cover glass 105 may be strengthened. For example, the cover glass 105 may be prepared by cutting it to size, cutting the first aperture 106 and the second aperture 107, and chemically etching an antiglare element onto a first surface of the cover glass 105. Under some embodiments, the first aperture 106 and the second aperture 107 may be cut proximate to a first edge of the cover glass 105. After such preparation of the cover glass 105, the cover glass 105 may be strengthened with chemical treatment such as with an ion exchange treatment. Under some embodiments, after strengthening of the cover glass 105, the surface of the cover glass 105 may be treated for defects such as by polishing the surface or applying a layer of glue, as described above.

At step 610, the touch sub-assembly 210 is coupled to the cover glass 105 via the first OCA layer 211. For example, the first surface of the first touch film 311 may be adhered to a second surface of the cover glass 105 such that the first edge of the first touch film 311 aligns with the first edge of the cover glass 105.

Figure 6D:
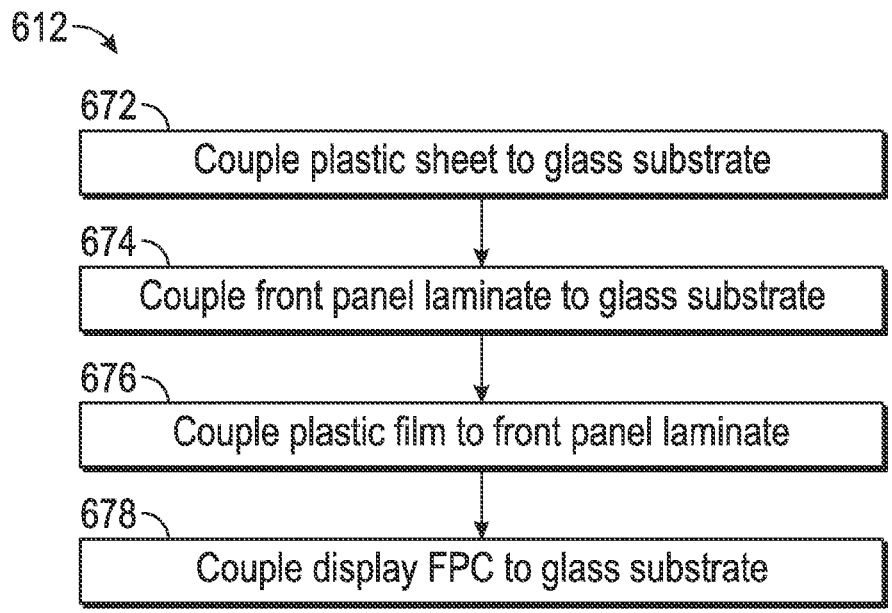

At step 612, the display sub-assembly 230 may be assembled, for example as illustrated in flow diagram 612 of FIG. 6D. At step 672, a first surface of the display plastic sheet 334 may be coupled to a second surface of the display glass substrate 333, using, for example, an OCA layer. At step 674, a second surface of the EPD layer 332 may be coupled to a first surface of the display glass substrate 333. At step 676, a first surface of the EPD layer 332 may be coupled to a second surface of the display plastic film 331, using, for example, an OCA layer. At step 678, the display FPC may be coupled to a first edge of the display glass substrate 333 with anisotropic conductive film (ACF).

Returning to FIG. 6A at step 614, the display sub-assembly 230 is coupled to the light sub-assembly 220 via the third OCA layer 222. For example, a first surface of the display plastic film 331 may be adhered to a second surface of the light guide 322 such that the first edge of the display plastic film 331, the first edge of the EPD layer 332, the first edge of the display glass substrate, and the first edge of the display plastic film aligns with the first edge of the light guide 322.

At step 616, the touch FPC 281 is coupled to the display FPC 238 and the light FPC 228 is coupled to the display FPC 238. At step 618, the first button 108 may be inserted in between the display FPC 238 at the first dome switch 538 and the cover glass 105 at the first aperture 106. Similarly, the second button 109 may be inserted in between the display FPC 238 at the second dome switch 539 and the cover glass 105 at the second aperture 107. Thereafter, the assembled stack assembly 103 and the cover glass 105 may be coupled to the electronic device 100.

Figure 7:
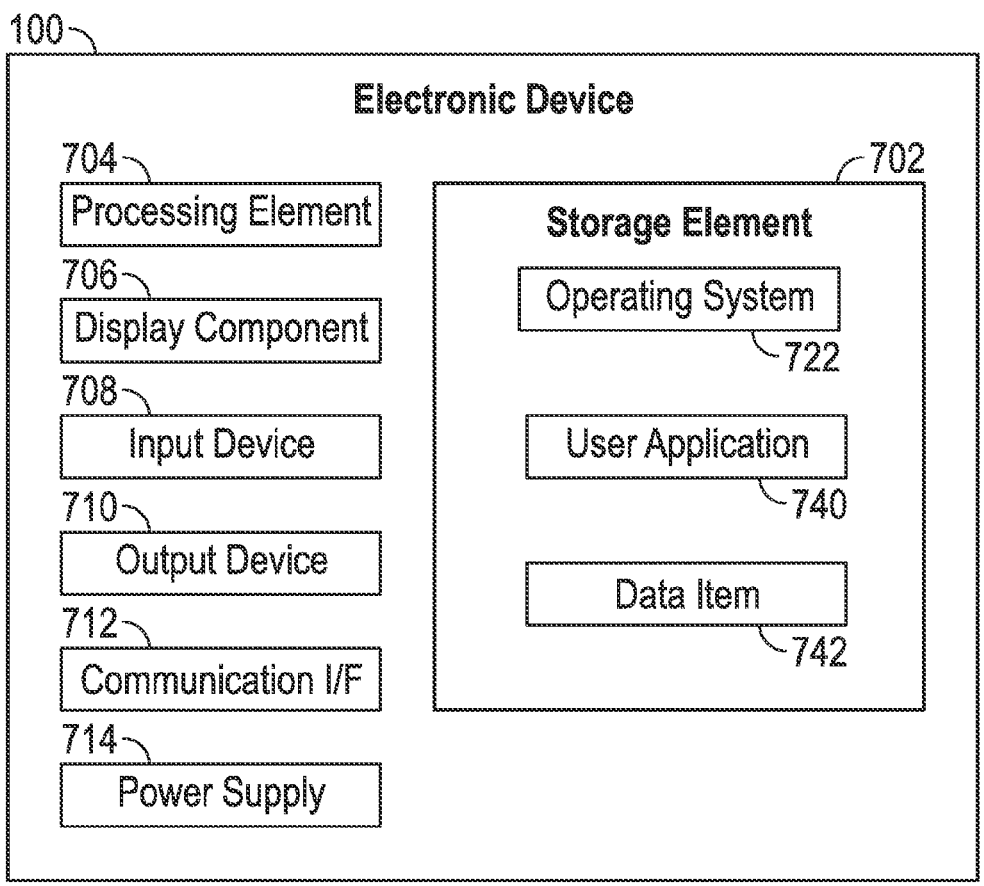
FIG. 7 illustrates an example block diagram of an electronic device, in accordance with embodiments of the present invention.

FIG. 7 illustrates an example block diagram of an electronic device 100, in accordance with embodiments of the present invention. The electronic device 100 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein.

The electronic device 100 may include a display component 706. The display component 706 may comprise, for example, one or more devices such as cathode ray tubes (CRTs), liquid crystal display (LCD) screens, gas plasma-based flat panel displays, LCD projectors, or other types of display devices, etc. The electronic device 100 may include one or more input devices 708 operable to receive inputs from a user. The input devices 708 can include, for example, a push button, touch pad, touch screen, wheel, joystick, keyboard, mouse, trackball, keypad, accelerometer, light gun, game controller, or any other such device or element whereby a user can provide inputs to the electronic device 100. These input devices 708 may be incorporated into the electronic device 100 or operably coupled to the electronic device 100 via wired or wireless interface. For computing devices with touch sensitive displays, the input devices 708 can include a touch sensor that operates in conjunction with the display component 706 to permit users to interact with the image displayed by the display component 706 using touch inputs (e.g., with a finger or stylus). The electronic device 100 may also include an output device 710, such as one or more audio speakers.

The electronic device 100 may also include at least one communication interface 712 comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the electronic device 100 may also include one or more wired communications interfaces for coupling and communicating with other devices, such as a USB port. The electronic device 100 may also include a power supply 714, such as, for example, a rechargeable battery operable to be recharged through conventional plug-in approaches, or through other approaches such as capacitive charging.

The electronic device 100 may also include a processing element 704 for executing instructions and retrieving data stored in a storage element 702 or memory. As would be apparent to one of ordinary skill in the art, the storage element 702 can include one or more different types of memory, data storage or computer-readable storage media, such as, for example, a first data storage for program instructions for execution by the processing element 704, and a second data storage for images or data and/or a removable storage for transferring data to other devices. The storage element 702 may store software for execution by the processing element 704, such as, for example, operating system software 722 and user applications 740. The storage element 702 may also store a data item 742, such as, for example, data files corresponding to one or more applications 740.

Figure 8:
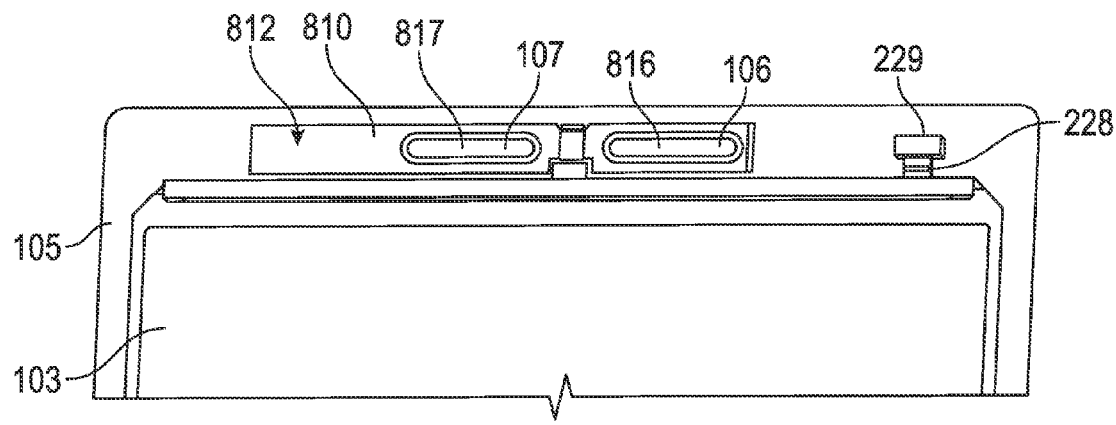
FIG. 8 illustrates a back view of a portion of a stack assembly and cover glass, in accordance with embodiments of the present invention.

FIG. 8 illustrates a back view of a portion of a stack assembly and cover glass, in accordance with embodiments of the present invention. As illustrated in FIG. 8, a cover glass 105 may comprise a first aperture 106 and a second aperture 107, through which two respective buttons 108,109 may be inserted. Although a portion of the display stack 103 is illustrated in FIG. 8, the display FPC 238 and the touch FPC 218 are not depicted, but the light connector 229 of the light FPC 228 is depicted.

Under some embodiments, the first button 108 may be positioned within the first aperture 106 and the first button 108 may be actuated by pressing the first button 108 such as with a finger press. To accommodate such positioning and such actuation, there may be a gap or a space between a portion of the cover glass 105 surrounding the first aperture 106 and other components of the stack assembly 103, such as the display FPC 238. Such a gap or a space may increase the risk of breakage of the cover glass 105, such as during reliability testing of repeated actuations of the first button 108. A cover glass support structure 810 may be advantageously adhered or coupled to the back surface of the cover glass 105 in the region of the apertures 106,107. A cover glass support structure 105 may comprise, for example, a planar plate, such as a thin, flat sheet or piece of metal or other material, of approximately uniform thickness. In some embodiments, the stack assembly 103 may be coupled to a first portion of the back surface of the cover glass 105 and the support structure 810 may be coupled to a second portion of the back surface of the cover glass 105. The cover glass support structure 810 may comprise a glass stiffening material such as a stainless steel material or the like. The cover glass support structure 810 may comprise a first support aperture 816 that has a dimension of a width and length that is approximately equivalent to the width and length of the first aperture 106 of the cover glass 105. Such a dimension allows for the placement of the cover glass support structure 810 in relation to the cover glass 105 to align the first support aperture 816 with the first aperture 106 such that the first button 108 may be placed within the first support aperture 816 and the first aperture 106. The cover glass support structure 810 may be beneficial to provide structural support, strength, or stiffening for the cover glass 105 in the region surrounding the first aperture 106. Such structural support, strength, or stiffening may reduce breakage of the cover glass 105, for example, from repetitive actuation of the first button 108. It is to be understood that the above description of the first button 108, the first aperture 106, and the first support aperture 816 may also apply to the second button 109, the second aperture 107, and a second support aperture 817.

Under some embodiments, the cover glass support structure 810 may comprise an electrically conductive material such as the stainless steel material described above. An electrically conductive material may be advantageous in order to provide a grounding that may diffuse electric static discharge. Under this embodiment, the cover glass support structure 810 may have a support structure grounding portion 812 that may extend along an edge of the cover glass 105.

Figure 9:
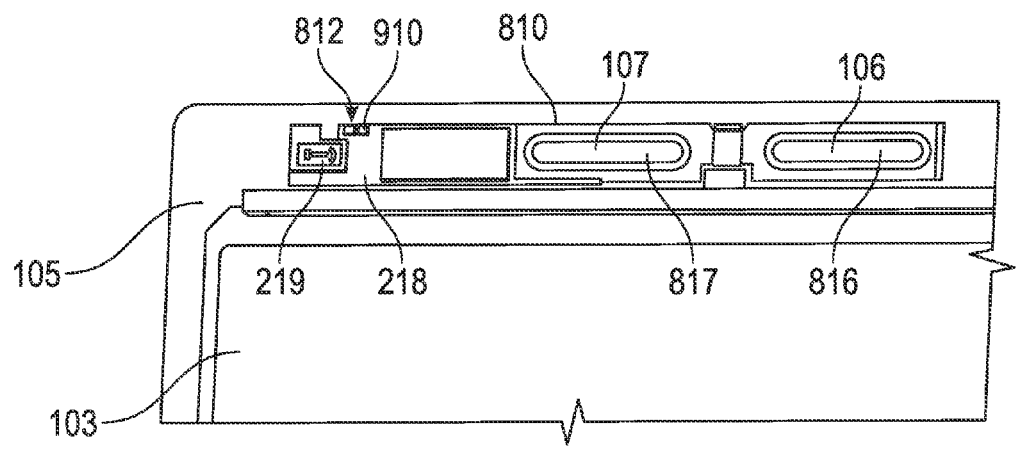
FIG. 9 illustrates a back view of a portion of a stack assembly and a cover glass, in accordance with embodiments of the present invention.

FIG. 9 illustrates a back view of a portion of a stack assembly and a cover glass, in accordance with embodiments of the present invention. The illustration of FIG. 9 is similar to the illustration of FIG. 8, with the primary difference being the depiction of the touch FPC 218 positioned generally proximate to the support structure grounding portion 812. The touch FPC 218 may comprise the touch connector 219 and a grounding clip 910. Under some embodiments, a ground path between the cover glass support structure 810 and a frame 1110 of the electronic device 100 may be via at least the grounding clip 910, as described below. The grounding clip 910 may comprise an electrically conductive material, such as a metal alloy.

Figure 10:
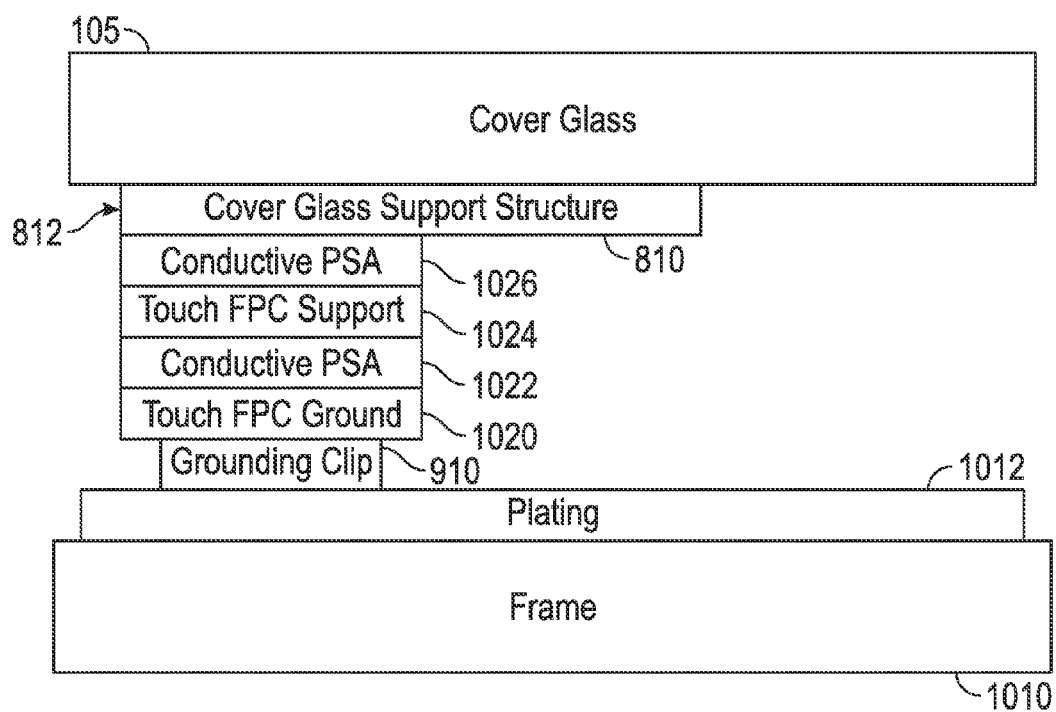
FIG. 10 illustrates an example schematic cross-section of a ground path, in accordance with embodiments of the present invention.

FIG. 10 illustrates an example schematic cross-section of a ground path, in accordance with embodiments of the present invention. As illustrated, the grounding clip 910 may be electrically coupled to the frame 1010. It is to be understood that the frame 1010 may be a chassis, a housing, or the like. Under some embodiments, the frame 1010 may comprise a base plastic material or the like, and the frame 1010 may have an inner surface that may comprise a metal plating 1012, a conductive nickel plating, or the like that is plated on top of the base plastic material. The metal plating 1012 may serve as a grounding layer or a grounding plane of the frame 1010. Examples of the metal plating 1012 are nanocrystalline metal or Nanovate metal from Integran Technologies Inc. of Mississauga, Canada. Although not depicted, under other embodiments, the frame 1010 may be comprised substantially of metal alloy, such as magnesium alloy or aluminum alloy, which may generally provide electrical grounding similar to the metal plating 1012.

The grounding clip 910 may be electrically coupled to the cover glass support structure 810 via one or more conductive elements. For example, the touch FPC 218 may comprise a touch FPC ground pad 1020 that may be electrically conductive and may provide grounding for the touch FPC 218. The grounding clip 910 may be electrically coupled to the touch FPC ground pad 1020. The touch FPC 218 may comprise a touch FPC support structure 1024 which may comprise an electrically conductive material such as stainless steel. The touch FPC support structure 1024 may provide stiffness to a portion of the touch FPC 218 to allow that portion of the touch FPC 218 to be non-flexible, rigid, or firm. The touch FPC support structure 1024 may be electrically coupled to the touch FPC ground pad 1020 via a first conductive pressure sensitive adhesive (PSA) 1022. The touch FPC support structure 1024 may be electrically coupled to the glass cover support structure 810 via a second conductive PSA 1026.

A ground path may be formed from the cover glass support structure 810 to the metal plating 1012 of the frame 1010 via the second conductive PSA 1026, the touch FPC support structure 1024, the first conductive PSA 1022, the touch FPC ground pad 1020, and the grounding clip 910. It is to be understood that a ground path may have a different route via electrically conductive elements. For example, the touch FPC ground pad 1020 and/or the touch FPC support structure may be omitted, as well as the corresponding electrically conductive PSAs 1022, 1026. It is to be understood that the ground path may be advantageous to dissipate or provide grounding for electric static discharge (ESD). For example, an ESD event may occur when a user actuates the first button 108 with a finger, but the ground path via at least the cover glass support structure 810 may advantageously cause the ESD to discharge into the metal plating 1012 of the frame 1010 and protect ESD-sensitive components of the electronic device 100.

Figure 11:
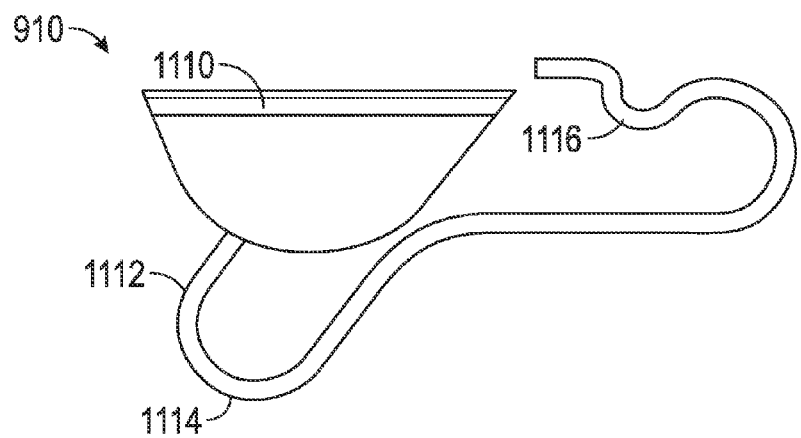
FIG. 11 illustrates an example grounding clip, in accordance with embodiments of the present invention.

FIG. 11 illustrates an example grounding clip 910, in accordance with embodiments of the present invention. The grounding clip 910 may comprise a body 1110 and a prong 1112. Under some embodiments, the body 1110 may electrically couple to the touch FPC ground pad 1020. Under some embodiments, the prong 1112 may comprise a bend 1114 that may electrically couple to the metal plating 1012 of the frame 1010. Under some embodiments, the prong 1112 may comprise a tip 1116 that may electrically couple to a touch sensor grounding ring of the touch sub-assembly. Such a touch sensor grounding ring may encompass or surround the capacitance grid pattern, signal lines, traces, and the like. Under some embodiments, the body 1110 of the grounding clip 910 may be surface mounted to the touch FPC 218. It is to be understood that the prong 1112 may form a spring such that the bend 1114 presses against the metal plating 1012 of the frame 1010.

Embodiments of the present invention may provide various advantages not provided by prior art systems. An exemplary advantage of some disclosed embodiments of an electronic device may be that the cover glass 105 of the device is resistant to damage due to being fully strengthened after the cover glass 105 is cut with the two apertures 106,107 for the page-turn buttons 108,109. A further exemplary advantage is that the weight of the electronic device is reduced due to the display sub-assembly 230 having a display glass substrate 333 comprised of glass that has a thickness of about 0.2 mm or the equivalent thickness of the EPD layer 332. Another exemplary advantage is that space savings are achieved with the display FPC 238 being utilized as a master FPC with which the touch FPC 218 and the light FPC 228 may couple, and with which the two page-turn buttons 108,109 may also couple.

While the invention has been described in terms of particular embodiments and illustrative figures, those of ordinary skill in the art will recognize that the invention is not limited to the embodiments or figures described. Many of the embodiments described above in relation to an e-book reader may be applied to a variety of electronic devices. For example, the stack assembly 103 and cover glass 105 may be utilized in a vehicle, such as an automobile, a boat, or an airplane, as a component of a dashboard that provides a user with information displayed on the stack assembly 103 with lighting capabilities for low light conditions, as well as providing input from a user via the buttons 108,109 or the touch sub-assembly 210.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is to be understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An electronic reader device comprising:
a processor;
memory electronically coupled to the processor, wherein the memory is configured to store a content item;
a reflective display sub-assembly configured to display the content item, the reflective display sub-assembly comprising:
a flexible plastic sheet;
a glass substrate coupled to the plastic sheet, wherein the glass substrate comprises a sheet of glass having a thickness of about 0.2 millimeters;
an electronic paper display (EPD) layer coupled to the glass substrate;
a plastic film coupled to the EPD layer; and
a flexible printed circuit (FPC) coupled to an edge of the glass substrate, the FPC operatively coupled to the processor;
a light sub-assembly comprising a planar light guide and a light source, the light sub-assembly being configured to direct light from the light source to the reflective display sub-assembly via the planar light guide to enhance the contrast of the content item, wherein:
the planar light guide has a first side and an opposing second side, the second side being coupled to the plastic film; and
the light source is positioned at an edge of the planar light guide and adjacent to the FPC; and
a touch sub-assembly configured to receive touch input, the touch sub-assembly coupled to the first side of the planar light guide.

2. The electronic reader device of claim 1, further comprising:
a cover glass coupled to the touch sub-assembly opposite the light sub-assembly, wherein the cover glass comprises a first surface, an opposing second surface, and an aperture configured to house a button, wherein the aperture extends from the first surface to the second surface, wherein the cover glass is strengthened via a glass ion exchange treatment.

3. The electronic reader device of claim 1, further comprising:
a cover glass comprising a first surface, an opposing second surface, and a first aperture, wherein the touch sub-assembly is coupled to a first portion of the second surface of the cover glass; and
a rigid planar plate comprising stainless steel and defining a second aperture, wherein the rigid planar plate is coupled to a second portion of the second surface of the cover glass, wherein the second aperture of the rigid planar plate aligns with the first aperture of the cover glass.

4. An electronic device comprising:
a display sub-assembly comprising:
a plastic sheet having a first surface and an opposing second surface;
a glass substrate having a first surface and an opposing second surface, wherein the second surface of the glass substrate is coupled to the first surface of the plastic sheet, wherein the glass substrate comprises a flexible sheet of glass;
an electronic paper display (EPD) layer having a first surface and an opposing second surface, wherein the second surface of the EPD layer is coupled to the first surface of the glass substrate;
a plastic film having a first surface and an opposing second surface, wherein the second surface of the plastic film is coupled to the first surface of the EPD layer; and
a first flexible printed circuit (FPC) coupled to an edge of the glass substrate, wherein the display sub-assembly is configured to display content;
a light sub-assembly coupled to the first surface of the plastic film of the display sub-assembly, the light sub-assembly comprising a light guide coupled to a light source positioned adjacent the first FPC, wherein the light guide is configured to direct light from the light source onto the display sub-assembly; and
a touch sub-assembly coupled to the light sub-assembly, wherein the touch sub-assembly is configured to receive touch input.

5. The electronic device of claim 4, further comprising:
a cover glass coupled to the touch sub-assembly opposite the light sub-assembly, wherein the cover glass comprises a first surface, an opposing second surface, and an aperture, wherein the aperture extends from the first surface to the second surface, wherein the cover glass is strengthened via a chemical treatment; and
a control button positioned in the aperture.

6. The electronic device of claim 4, further comprising:
a cover glass comprising a first surface, an opposing second surface, and a first aperture, wherein a first portion of the second surface of the cover glass is coupled to the touch sub-assembly opposite the light sub-assembly; and
a support structure comprising a second aperture, wherein the support structure is coupled to a second portion of the second surface of the cover glass, wherein the second aperture of the support structure aligns with the first aperture of the cover glass.

7. The electronic device of claim 4, wherein the first FPC comprises:
a first socket configured to couple with a first connector of the light sub-assembly, wherein the first socket is positioned at a first end of the first FPC; and
a second socket configured to couple with a second connector of the touch sub-assembly, wherein the second socket is positioned at a second end of the first FPC opposed to the first end of the first FPC.

8. The electronic device of claim 4, further comprising:
a control button,
wherein the first FPC comprises a switch, the switch configured to be actuated by the control button.

9. The electronic device of claim 8, wherein the first FPC comprises a top surface and an opposing bottom surface, wherein the first FPC further comprises:
a first support structure coupled to a first portion of the bottom surface of the first FPC, wherein the first support structure is positioned beneath the switch; and
a second support structure coupled to a second portion of the bottom surface of the first FPC, wherein the first FPC is folded such that the first support structure is positioned above the second support structure and wherein the first support structure is coupled to the second support structure.

10. The electronic device of claim 4, wherein the light guide has a first surface and an opposing second surface, the light source is coupled to an edge of the light guide, and the light sub-assembly further comprises:
a light-diffusing element coupled to the light source and to a first surface portion of the first surface of the light guide;
a light-absorbing element coupled to the light-diffusing element and to a second surface portion of the first surface of the light guide, wherein the touch sub-assembly is coupled to a third surface portion of the first surface of the light guide, wherein the display sub-assembly is coupled to the second surface of the light guide; and
a second flexible printed circuit coupled to the light guide.

11. The electronic device of claim 4, wherein the touch sub-assembly comprises:
a first touch film having a first surface and an opposing second surface, the first surface of the first touch film including a first capacitance grid pattern;
a second touch film having a first surface and an opposing second surface, the first surface of the second touch film including a second capacitance grid pattern, wherein the second surface of the first touch film is coupled to the first surface of the second touch film, wherein the second surface of the second touch film is coupled to the light sub-assembly; and
a third flexible printed circuit coupled to an edge of the first touch film and to an edge of the second touch film.

12. The electronic device of claim 11, wherein the first touch film comprises an ultraviolet light cut material.

13. The electronic device of claim 4, further comprising:
a mainboard module including a processor; and
a control button;
wherein the first FPC comprises:
a display connector coupled with the mainboard module;
a first socket coupled with a first connector of the light sub-assembly;
a second socket coupled with a second connector of the touch sub-assembly; and
a switch configured to be actuated by the control button, the switch being positioned between the first socket and the second socket.

14. A method comprising:
providing a plastic sheet having a first surface and an opposing second surface;
coupling a first surface of a glass substrate to the second surface of the plastic sheet, wherein the glass substrate comprises a flexible sheet of glass;
coupling a first surface of an electronic paper display (EPD) layer to a second surface of the glass substrate;
coupling a first surface of a plastic film to a second surface of the EPD layer;
coupling a first flexible printed circuit (FPC) to an edge of the glass substrate;
coupling a touch sub-assembly to a light sub-assembly, wherein the touch sub-assembly is configured to receive touch input and the light sub-assembly comprises a light source and a light guide; and
coupling the light guide of the light sub-assembly to a second surface of the plastic film, wherein the light source of the light sub-assembly is positioned adjacent to the first FPC.

15. The method of claim 14, further comprising:
coupling a cover glass to the touch sub-assembly opposite the light sub-assembly, wherein the cover glass comprises a first surface, an opposing second surface, and an aperture configured to house a button, wherein the aperture extends from the first surface to the second surface;
strengthening the cover glass with a chemical treatment; and
adhering an opaque glue to the third surface.

16. The method of claim 14, further comprising:
coupling a first socket to the first FPC, wherein the first socket is configured to couple with a first connector of the light sub-assembly, wherein the first socket is positioned at a first end of the first FPC; and
coupling a second socket to the first FPC, wherein the second socket is configured to couple with a second connector of the touch sub-assembly, wherein the second socket is positioned at a second end of the first FPC opposed to the first end of the first FPC.

17. The method of claim 14, further comprising:
prior to coupling the first FPC to the edge of the glass substrate, coupling a switch to the first FPC, wherein the switch is positioned in between the first socket and the second socket, and wherein the switch is configured to be actuated by a button.

18. The method of claim 17, further comprising:
coupling a first support structure to a first portion of a bottom surface of the first FPC, wherein the first support structure is positioned beneath the switch;
coupling a second support structure to a second portion of the bottom surface of the first FPC;
folding the first FPC such that the first support structure is positioned above the second support structure; and
coupling the second support structure to the first support structure.

19. The method of claim 14, further comprising:
coupling the light source to an edge of the light guide, wherein a first surface portion of a first surface of the light guide is coupled to the touch sub-assembly, wherein an opposing second surface of the light guide is coupled to the second surface of the plastic film of the display sub-assembly;
coupling a light-diffusing element to the light source and to a second surface portion of the first surface of the light guide;
coupling a light-absorbing element to the light diffusing element and to a third surface portion of the first surface of the light guide; and
coupling a second flexible printed circuit to the light guide.

20. The method of claim 14, further comprising:
coupling a second touch film to a first touch film, wherein the first touch film has a first capacitance grid pattern, wherein the second touch film has a second capacitance grid pattern; and
coupling a third flexible printed circuit to an edge of the first touch film and to an edge of the second touch film.

* * * * *